Dec. 15, 1942.     J. F. MERKEL     2,305,185
CONTROL SWITCH FOR RAILWAY TRAFFIC CONTROLLING SYSTEMS
Filed Aug. 12, 1937     2 Sheets-Sheet 1
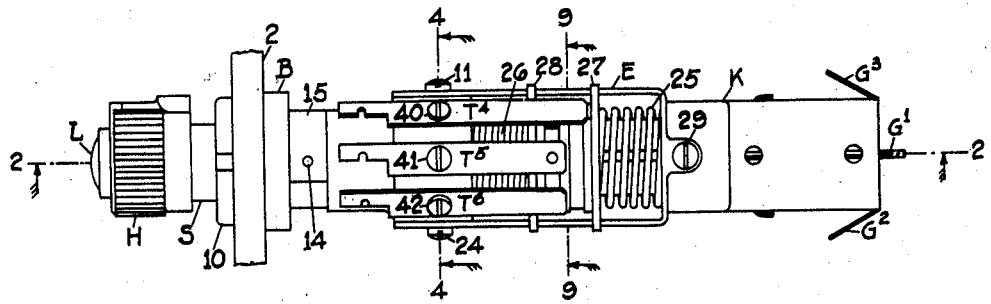
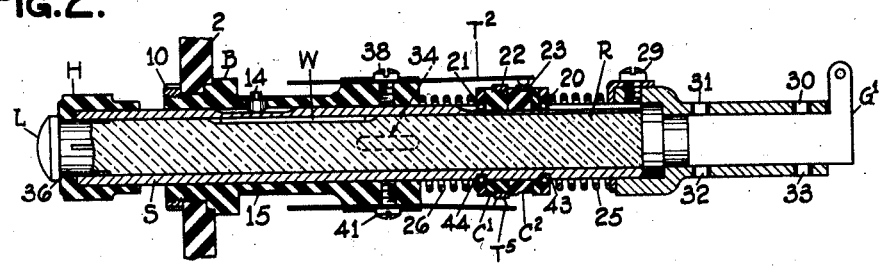
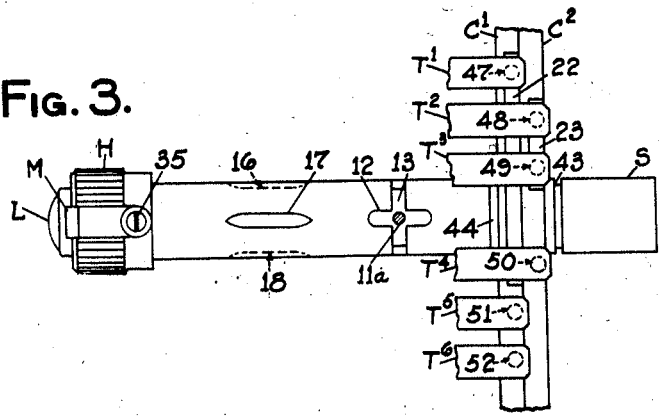
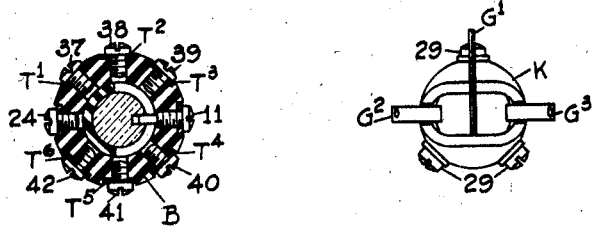 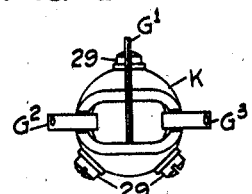
INVENTOR
Joseph F. Merkel,
BY Neil M. Preston
his ATTORNEY Dec. 15, 1942.  J. F. MERKEL  2,305,185
CONTROL SWITCH FOR RAILWAY TRAFFIC CONTROLLING SYSTEMS
Filed Aug. 12, 1937  2 Sheets-Sheet 2

INVENTOR
Joseph F. Merkel,
BY Neil H. Preston
his ATTORNEY

Patented Dec. 15, 1942

2,305,185

UNITED STATES PATENT OFFICE 2,305,185

CONTROL SWITCH FOR RAILWAY TRAFFIC CONTROLLING SYSTEMS

Joseph F. Merkel, Rochester, N. Y., assignor to General Railway Signal Company, Rochester, N. Y.

Application August 12, 1937, Serial No. 158,720

4 Claims. (Cl. 200—4)

This invention relates to manually controlled switches or contactors, and more particularly pertains to switches of a type which selectively close contacts in accordance with distinctive manipulations combined with visual indication means.

One of the objects of the present invention is to provide a manually controlled switch with four distinctive off-normal positions so organized with a single self-contained indicator as to provide a plurality of indications.

Such a control switch is particularly useful when located on a control panel for controlling the movement of trains through an interlocking plant in that such a control switch can be used to select a number of optional circuits as well as to indicate how the various apparatus which it controls has responded to its operation.

Other objects, purposes and characteristic features of the present invention will be in part obvious from the accompanying drawings and in part pointed out as the description progresses.

In describing the invention in detail, reference will be made to the accompanying drawings in which similar reference characters refer to corresponding parts throughout the several views, and in which:

Fig. 1 is a plan view of the switch constructed in accordance with the present invention;

Fig. 2 is an elevational view of the control switch with certain parts shown in cross section as viewed on line 2—2 of Fig. 1;

Fig. 3 is an elevational view of only certain parts of the control switch and with the contacts for the circuit controller shown diagrammatically all in one plane.

Fig. 4 is a sectional view of the control switch as viewed on line 4—4 of Fig. 1;

Fig. 5 is a rear end view of the control switch;

Figure 6:
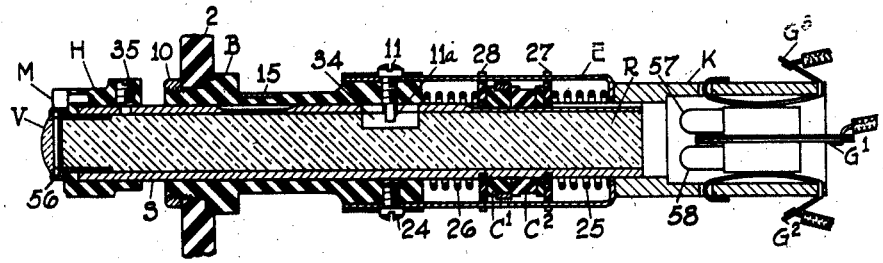
Fig. 6 is a plan sectional view of the control switch with certain parts not shown.

The specific embodiment shown is assembled about a mounting member B which is molded of suitable insulating material such as "Bakelite," and is secured to a panel 2, or other suitable mounting, by means of a nut 10 threaded onto member B in the front of the panel.

A metallic sleeve S is retained within mounting member B by the extension pin 11a on the end of screw 11 which extends through slots 12 and 13 (Fig. 3) in sleeve S. Slot 13 limits the rotation of the sleeve to 90° in either direction from a center position, and slot 12 permits sleeve S to be depressed or pulled out only when the sleeve is in center position with respect to rotation. The sleeve S is held in its rotated positions by means of a nub 14 which is biased by spring 15 through an opening in member B so as to engage recesses 16, 17 and 18 in the metallic sleeve S in such a manner as to cause the switch to be retained in its last operated position until it is manually operated to another position.

Figure 9:
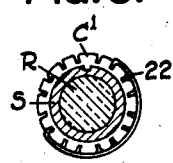
Fig. 9 is a sectional view of the control switch as viewed on line 9—9 of Fig. 1.

Commutators $C^1$ and $C^2$ are molded of insulating material, such as "Bakelite," so as to have slots spaced at frequent intervals for securing commutator segments in place (Fig. 9). These commutators are keyed onto the metallic sleeve S so that they will be caused to rotate with the sleeve, and are held in place by means of wire springs 20 and 21 which are located in grooves 43 and 44 respectively in sleeve S. The commutators are therefore securely fastened to sleeve S so as to be caused to rotate as well as to be moved forward and backward with the sleeve.

The commutators $C^1$ and $C^2$ are fitted with low resistance contact segments 22 and 23 respectively, and the segments are held in place by reason of their ends having been bent into the slots in their respective commutator (Fig. 9).

Figure 7:
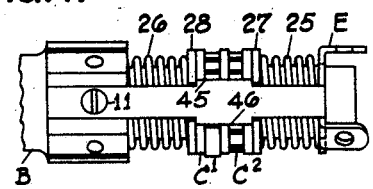
Fig. 7 is a partial side view to show the centering bracket.
Figure 8:
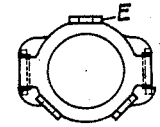
Fig. 8 is a rear end view of the control switch with the lamp socket removed and with certain parts not shown.

A bracket E has its two legs secured to member B by means of screws 11 and 24, and is used for supporting the lamp socket K as well as for determining the center position of the sleeve S with reference to forward and backward movement. The sleeve S is biased to a center, or a mid-position, with reference to forward and backward movement by means of the springs 25 and 26; but the mid-position of the sleeve S is determined for washers 27 and 28 by the projections or stops 45 and 46 on the legs of the bracket E (Fig. 7). These washers are of insulating material, such as fiber, and are slotted so as to move freely throughout the length of the narrow portion only of the legs of the bracket E.

The lamp socket K is molded of insulating material, such as "Bakelite," and is fitted over the end of sleeve S and secured to the bracket E by means of screws 29. A common metallic contact $G^1$ is made up of two parts for the purpose of assembly so that one part has nubs 30 and 31 which are fitted into holes provided in the top of socket K and the other part is provided with nubs 32 and 33 which are fitted into holes in the bottom of socket K (see Figs. 2, 5 and 6). After the two sections of the contact have been assembled, they are securely fastened together at their ends with solder. The contacts $G^2$ and $G^3$ are constructed of spring metal having low resistance qualities and are secured in position by having their ends bent after having been inserted through holes in the sides of the socket K (see Fig. 6). The spacing of the contacts is such that two lamps having distinctive colors may be inserted into the socket so that one lamp occupies the space on one side of the common contact $G^1$ and the other lamp occupies the space on the other side of the common contact $G^1$.

For example, lamp 57 may be white and lamp 58 may be green, but it is of course to be understood that any desired colors may be chosen for the lamps. Each of the lamps 57 and 58 is provided with an individual energizing circuit, which circuits are organized so that only one lamp is illuminated at the same time. These energizing circuits are contemplated as being controlled in accordance with the response of the device, or devices, governed by the contacts of the switch.

A transparent rod R of suitable material, such as glass, Celluloid, or the like, extends through the center of sleeve S and is secured in a stationary position with reference to rotation by means of the extension 11a on the end of screw 11 extending into the annular slot 34. A wire W providing tension between the translucent rod R and the sleeve S is fitted into a recess provided in the rod.

A hollow molded knob H is fitted over the front end of sleeve S and is secured in position by means of set screw 35. The outside surface of the knob is knurled, and a marker M of a color distinctive from the knob is fitted into a hole in the knob. This clearly indicates the position of the control switch with respect to rotation.

Figure 10:
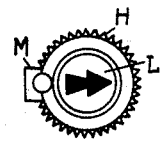
Fig. 10 is a front end view of the control switch.

A lens L is located at the center of the knob and is secured to the transparent rod R by means of its mounting sleeve 36. Inasmuch as the lens is fastened to the rod R, it remains in a stationary position with reference to the rotation of the knob H, so the lens may therefore have included thereon arrows or other desired symbols which are required to remain in a given position with reference to rotation (Fig. 10).

For example, the present embodiment shows an arrow which is displayed on the face of the lens L by reason of an opening in a circular disc 56 cut in the shape of an arrow. This circular disc is preferably of opaque white Celluloid so that while the indicator lamps are deenergized, the background of the lens appears to be white and the arrow appears dark colored or nearly black. However, when one of the indicator lamps 57 or 58 is energized, then the light from such lamp is transmitted through the transparent rod R to illuminate the lens so that the arrow appears of a color depending upon the color of the particular indicator lamp then energized. With the present arrangement provided in accordance with the present invention, the arrow appears illuminated on the face of the lens the same as if the indicator lamps 57 and 58 were located inside of the knob H close to the lens, which structurally is not feasible. In other words, if the transparent rod were not employed, then the indicator lamps would of necessity be required to be of a higher wattage inasmuch as the amount of light falling upon a particular surface is inversely proportional to the square of the distance between the source of light and such surface. With the present invention, substantially all of the light falling upon the end of the rod next to the indicator lamps is transmitted to the other end of the rod to illuminate the lens L. This is because the light which enters the rod R, is kept within such rod by reason of the total reflection from the surface of the rod. Total reflection is aided by reason of the light from the lamps falling obliquely on the surface of the end of the rod at such an angle that the refraction bends the light substantially parallel to the axis of the rod.

Although the lamp socket K is shown as having only two lamps, it is to be understood that a larger number of lamps, such as four or five, might be provided for by a larger socket having the lamps so arranged in a circle that light from each of the lamps would fall obliquely at a proper angle on the end of the rod R.

It is contemplated that these lamps are individually controlled so that only one is illuminated at the same time, but if desired, lamps of primary colors may be used and selectively energized to give a secondary color indication on the face of the lens L. For example, a blue and a yellow lamp energized at the same time would give a green indication.

The metallic contact fingers $T^1$, $T^2$, $T^3$, $T^4$, $T^5$ and $T^6$ are provided with low resistant contact points 47, 48, 49, 50, 51 and 52 respectively, and are securely fastened at spaced points about member B by means of screws 37, 38, 39, 40, 41 and 42 (see Figs. 3 and 4). These contact fingers are so biased by the spring pressure of the contact fingers themselves, that a pressure is exerted between the low resistance contact points and the segments of the circuit controllers at all times.

It is obvious that various contact combinations may be provided by a particular arrangement of the contact fingers in combination with different arrangements of the segments on the circuit controllers; and also that various contact combinations may be provided by changing the length of the contact fingers, which may determine whether or not a circuit is to be closed or opened when the switch is in depressed or pulled positions.

An example of the combination of contacts available is illustrated in Fig. 3 in which a circuit is completed between contact fingers $T^2$ and $T^3$ by segment 23 when the control switch is in a normal position. When the switch is rotated in a clockwise direction, a circuit is closed between the contact fingers $T^5$ and $T^6$ through segment 22. When the control switch is operated in a counterclockwise direction, a circuit is closed between contact fingers $T^1$ and $T^6$ by reason of segment 22 having completed an electrical connection between these contact fingers. When the control switch is depressed, which condition can only exist when the switch is in the normal position with respect to rotation, a circuit is closed between contact fingers $T^2$, $T^3$ and $T^4$ by reason of these contact fingers being connected to segment 22. When the control switch is pulled out, it is obvious that the circuit normally closed between the contact fingers $T^2$ and $T^3$ by segment 23 is broken.

Having described a control switch having specific contact selections arranged according to the present invention, it is desired to be understood that this form is selected to facilitate in the disclosure of the invention rather than to limit the number of forms which it may assume; and, it is to be further understood that various modifications, adaptations and alterations may be applied to the specific form shown to meet the requirements of practice, without in any manner departing from the spirit or scope of the present invention except as limited by the appending claims.

Having described my invention I now claim:

1. In combination, in a circuit controller, an extending tubular mounting member, a tubular sleeve longitudinally slidable within, and extending through said tubular member, a cross shaped slot in the sleeve, a pin in the mounting member and projecting into the slot for limiting the movement of said sleeve in the mounting member slidably and rotatably from a center position only, spring means for restoring said sleeve to said center position in the mounting member and including a lug fixed to the sleeve at a point beyond the end of the mounting member, a bracket fixed by one of its ends to the end of the mounting member adjacent said lug and having its other end extending beyond said lug, a stop on the bracket and opposite said lug, a washer at each side of the lug and slidable on the sleeve, and on the bracket only until against the said stop, and the two biasing springs, one between the washer at one side of the lug and the extending end of the bracket, and the other between the washer at the other side of the lug and the adjacent end of the mounting member.

2. In combination; a mounting member having a cylindrical passageway extending therethrough; a tubular sleeve extending through said cylindrical passageway and movable therein both slidably and rotatably; a right angled cross form slot in the sleeve; a single pin secured to said mounting member and extending into the slot for limiting the rotation of said sleeve to substantially 90° in either direction from a normal position, and for allowing said sleeve to be moved longitudinally in opposite directions a limited distance only from said normal position; commutators, having commutator segments, secured to said sleeve; and contacts located at spaced intervals about said mounting member and arranged to selectively make contact with said segments only when said sleeve is in predetermined rotated or slid positions, resilient biasing means for slidably biasing the sleeve toward its normal position from either of its extreme slid positions.

3. In combination; a mounting member having a cylindrical passageway extending therethrough; a tubular sleeve extending through said cylindrical passageway and movable therein both slidably and rotatably; a substantially right angled cross form slot in the sleeve; a single pin secured to said mounting member and extending into the slot for limiting the rotation of said sleeve to substantially 90° in either direction from a normal position, and for allowing said sleeve to be moved longitudinally in opposite directions a limited distance only from said normal position; commutators, having commutator segments, secured to said sleeve; and contacts located at spaced intervals about said mounting member and arranged to selectively make contact with said segments only when said sleeve is in predetermined rotated or slid positions, resilient biasing means for slidably biasing the sleeve toward its normal position from either of its extreme slid positions, and detent means releasably holding the sleeve in its normal, and each extreme rotative position.

4. In combination, an extending tubular mounting member, a tubular sleeve longitudinally slidable within, and extending through said tubular member, spring means for restoring said sleeve to a center position in the mounting member and including a lug fixed to the sleeve at a point beyond the end of the mounting member, a bracket fixed by one of its ends to the end of the mounting member adjacent said lug and having its other end extending beyond said lug, a stop on the bracket and opposite said lug, a washer at each side of the lug and slidable on the sleeve, and on the bracket only until against the said stop, and two biasing springs, one between the washer at one side of the lug and the extending end of the bracket, and the other between the washer at the other side of the lug and the adjacent end of the mounting member.

JOSEPH F. MERKEL.